United States Patent

[11] 3,530,880

[72] Inventor Ronald G. Hune
830 Oystercreek, Sugarland, Texas 77478
[21] Appl. No. 698,483
[22] Filed Jan. 17, 1968
[45] Patented Sept. 29, 1970

[54] SUPERSENSITIVE CHECK VALVE
11 Claims, 4 Drawing Figs.

[52] U.S. Cl. .................................................... 137/515.5,
137/519, 137/533.27, 251/368
[51] Int. Cl. ..................................................... F16k 15/00
[50] Field of Search .......................................... 251/338,
368(Cursory); 137/516.19, 516.21, 516.23, 517, 519,
533, 533.17, 533.21, 533.23, 533.25, 533.27, 515,
515.3, 515.5, 515.7, 516.15, 516.17, 533.19;
126/362

[56] References Cited
UNITED STATES PATENTS

| 802,037 | 10/1905 | Giller | 137/533.19X |
| 1,002,252 | 9/1911 | Fitts et al. | 137/519 |
| 2,202,123 | 5/1940 | Strode | 137/519 |
| 2,473,804 | 6/1949 | Ledoux | 137/519X |
| 3,109,451 | 11/1963 | Mihalakis | 137/517X |
| 3,169,548 | 2/1965 | McIntosh | 251/368X |
| 3,245,669 | 4/1966 | Huggins et al. | 137/533.17X |

FOREIGN PATENTS

| 770,825 | 3/1957 | Great Britain | 137/516.21 |
| 851,504 | 10/1960 | Great Britain | 137/533.19 |

Primary Examiner—William F. O'Dea
Assistant Examiner—David J. Zobkiw
Attorney—Buell, Blenko and Ziesenheim ABSTRACT: A check valve is disclosed having a lightweight but rigid checking element. The check valve is so constructed that opening and closing of the element can be effected by very small differential pressures across the valve. Desirably, the checking element is weighted so that it can be moved, for example, by convection currents of the medium in which the valve is used. The check valve is provided with a minimum of moving parts and is constructed so that the various clearances among the engaging parts of the check valve are not critical and careful machining of engaging parts is not required. Thus, the check valve can be employed for indefinite periods of time in fluid mediums which are corrosive or conductive to scale formation.

Patented Sept. 29, 1970
3,530,880
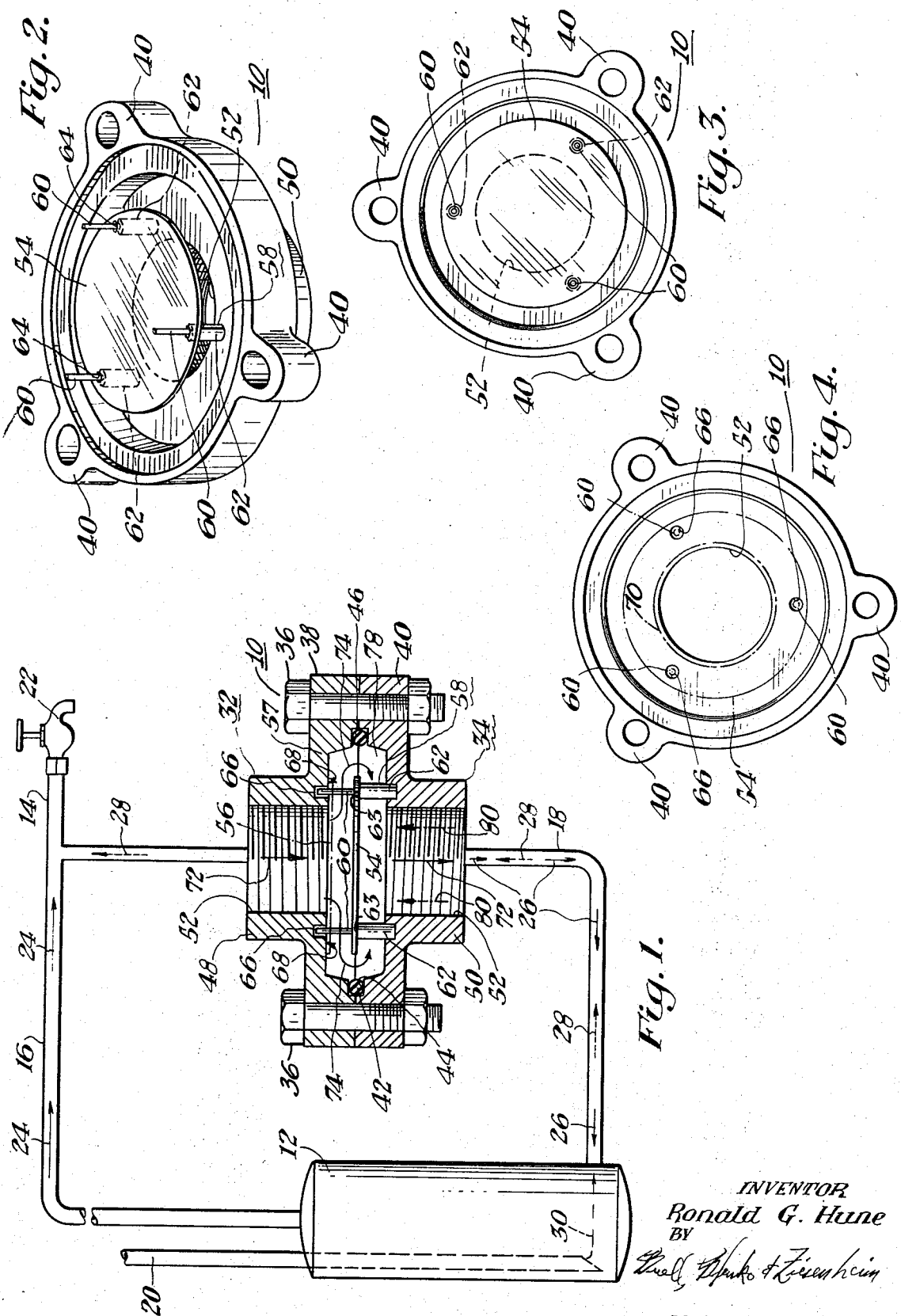
INVENTOR
Ronald G. Hune
BY
HIS ATTORNEYS

SUPERSENSITIVE CHECK VALVE

The present invention relates to a check valve of superior sensitivity, and more particularly to a check valve of the character described which can be employed, for example, in hot water convection systems and similar applications wherein the checking element of the check valve must be opened and closed by very small differential pressures.

As this description proceeds it will be appreciated that the structure of the supersensitive check valve disclosed herein is amenable to many diverse applications wherein check valves are conventionally used. In this description, however, the check valve of my invention is exemplarily described in connection with a hot water convection circuit in order to emphasize the advantages flowing from use of my novel check valve. In such application, the convection currents engender only very slight differential pressures across the check valve for the actuation thereof. Moreover, in most domestic hot water systems the water available contains significant amounts of mineral substances which are conducive to scale formation, particularly when the water is heated. This problem coupled with the inherent corrosiveness of hot water has heretofore prevented the construction of an acceptable check valve for use in a hot water convection circuit.

Hot water convection systems are very old, for their advantages have long been recognized. A properly operated convection system supplies hot water at the instant any of the faucets coupled to the convection circuit is turned on. Hopefully, the hot water does not thereafter vary in temperature as it continues to run from the faucet. Thus, in a properly operated hot water convection circuit it is not necessary to empty the cold water standing in the supply line between the faucet and the top of the hot water tank before hot water at constant temperatures is available. Subsequent adjustment of the faucet is not required (in a properly operated convection circuit), and the water standing in the pipes is not wasted.

In the simplest form of hot water convection circuit, one or more faucets are coupled to a closed conduit connecting the top and the bottom of the hot water heater tank. When water is not being withdrawn from the hot water system, convection currents cause a continuous circulation of hot water through the convection circuit from the top to the bottom of the tank. Although this arrangement provides immediate hot water, the temperature of the hot water decreases as it is being used thereby requiring frequent adjustment of the faucet. The drop in hot water temperature results from water entering the faucet from both the top and the bottom of the hot water tank via the convection loop. The water thus withdrawn from the bottom of the tank becomes increasingly colder as make-up cold water enters the hot water tank and settles to the bottom thereof.

The obvious solution to this problem is to mount a check valve in the return leg of the convection circuits so that the water cannot flow from the cooler bottom portions of the tank to the faucet when the latter is turned on. This solution, as far as I am aware, has never been attained because, heretofore, there has been no appropriately constructed check valve of sufficient sensitivity. A convectional circulating system is capable of developing only very limited differential pressures across a check valve which may be disposed in the system. Known check valves intended for this purpose, such as typified by the patents to Hart 2,513,862 and Thompson 1,844,613 have utilized valve members which are too heavy to be actuated properly by the small differential pressures developed by convectional currents. Additionally, prior check valves such as those mentioned utilize close-fitting moving parts which are readily jammed by boiler scale or are corroded by the hot water itself. Zerk, 1,797,280 discloses a check valve having a non-metallic valve disc, but which otherwise suffers from the disadvantages noted above. The valve has a relatively large number of component parts with relatively small passages. In addition, the valve disc is pliable and therefore would not appear to be capable of accurate opening and closing movement.

In the present invention, there are no biasing springs, pivoted components, ball checks, or other closely fitted moving parts which are subject to wear and malfunction. For example, Holmes 2,915,080, employs a slide valve movable back and forth across the opening of a return convection leg to the bottom of a hot water tank. Thus, Holmes provides convection circulation when the faucets are closed but attempts to close the return leg when the faucets are opened. However, the Holmes valve is subject to jamming by boiler scale and corrosion as noted above. The latter check valve is not capable of reliable operation with the small differential pressures involved.

As a result of the unavailability of a check valve of suitable sensitivity for this purpose, present plumbing practices for both domestic and commercial hot water systems almost completely disregard any attempt to provide instant hot water at any of the faucets. This represents an ever-increasing waste of water at a time when clean water sources are rapidly diminishing.

The unavailability of a suitable check valve is attested by more elaborate hot water heating circuits wherein a pump is employed for positive circulation through the "convection" loop in order to prevent cold water from being withdrawn from the bottom of the hot water tank. A check valve is sometimes utilized in conjunction with the circulating pump. Because of the higher differential pressures developed by the pump, such conventional check valve can usually operate properly as far as reopening when the hot water faucet is closed, as a result of the higher pressure differential supplied by the pump. This system, however, results in high operating costs, maintenance of components owing to boiler scale and corrosion, and of course a high installation cost.

I overcome these disadvantages of the prior art by providing a supersensitive check valve wherein the checking element is virtually weightless in the medium in which the check valve is employed. Thus, in the case of hot water, the checking element is fabricated from a material having a specific gravity only slightly higher than that of the water, for example, in the range of $1.05-1.15$. This in conjunction with other novel features of my check valve enables the checking element to be moved between its open and closed positions by a very small differential pressure across the check valve.

In the case of hot water convection systems, the check valve has the most important advantage of being completely and reliably reopened by the very small pressures developed by the hot water convection current. By the same token, closure of the checking element is always ensured when the hot water faucet is opened. Therefore, when hot water is withdrawn from the convection circuit complete closure of the check valve ensures that the hot water is withdrawn only through the top leg of the convection circuit, i.e., from the top of the hot water tank, so that the temperature of the withdrawn hot water remains essentially constant within the capacity of the hot water tank. When the hot water faucet is closed the check valve always reopens to reestablish the convection circuit to maintain a constant temperature of hot water at the faucet.

The guiding system for my novel checking element in its path of movement between its open and closed portions is constructed for relatively loose engagement with the checking element. Moreover, the engagement between the guiding arrangement and the checking element is self-cleaning so that the check valve can operate indefinitely in a corrosive medium or in one from which considerable foreign material may be precipitated. Thus, my novel check valve is useful in a wide variety of applications, but is particularly adapted for use in a hot water convection system for stabilizing water temperature. The relatively wide tolerances along with its single moving part and the aforementioned self-cleaning feature prevent the check valve from becoming jammed as a result of deposition of boiler scale or hot water corrosion.

The loose engagement between the checking element and its guiding system permits the checking element to undergo a considerable degree of tilt. Such tilting endows the checking elements with a self-aligning feature such that the valve seat of my novel check valve does not have to be accurately or precisely positioned relative to the housing.

The aforementioned guiding arrangement for the checking member desirably is provided with integral stop members which define the open position of the checking element. The engagement of the checking element with the guiding arrangement and with the valve seat and the stop members is such that it cannot hang up in either its open or closed positions or in some intermediate position.

To facilitate assembly of my novel check valve, the various components thereof are symmetrically arranged so that the housing components can be assembled in a number of relative positions without effecting the operation of the check valve.

Finally, my check valve construction can be readily disassembled, in the event that cleaning or maintenance thereof ever becomes necessary, even without removal from the system in which the valve has been installed. In furtherance of this purpose and also to facilitate installation of the check valve, the check valve housing is constructed somewhat in the form of a union, the components of which can be assembled in sealed relation.

I accomplish these desirable results by providing a check valve having a discoidal checking element mounted therein for movement between open and closed positions thereof relative to a complementary valve seat formed in said check valve, a plurality of elongated guides mounted in said housing, said guides being disposed parallel to the path of checking element movement, said guides being spaced around the periphery of said valve seat, and said checking element slidably engaging said guides throughout its path of movement.

I also desirably provide a similar arrangement wherein a stop member is formed on each of said guides at a point removed from said valve seat, said stop members together defining the open position of said checking element.

I also desirably provide a similar arrangement wherein each of said guides is a post having a thickened portion, a reduced post portion is secured to each of said thickened portions and inserted through an aperture therefor in said checking element, and the junctions between said thickened and said reduced portions form said stop members.

I also desirably provide a similar arrangement wherein said checking element apertures are larger than the cross section of said reduced post portions but smaller than said thickened post portions so that boiler scale and the like will not interfere with the sliding engagement between said checking element and said reduced post portions and so that said checking element can tilt relative to said posts for self-alignment with said valve seat.

I also desirably provide a similar arrangement wherein said valve seat is formed on an inner surface of said housing, and said guides are secured to an opposite inner surface of said housing, the ends of said guides terminating adjacent said first-mentioned inner surface.

During the foregoing discussion, various objects, features and advantages of the invention have been set forth. These and other objects, features and advantages of the invention together with structural details thereof will be elaborated upon during the forthcoming description of certain presently preferred embodiments of the invention, together with presently preferred methods of practicing the same.

In the accompanying drawings I have shown certain presently preferred embodiments of the invention and have illustrated certain presently preferred methods of practicing the same, wherein:

FIG. 1 shows a cross sectional view of one arrangement of a supersensitive check valve arranged according to the teachings of my invention and illustrated in connection with a hot water convection circuit schematically represented in FIG. 1;

FIG. 2 is an isometric view of the checking element and lower housing section of the check valve as shown in FIG. 1;

FIG. 3 is a top plan view of the lower housing section shown in FIG. 2; and

FIG. 4 is a bottom plan view of the upper housing section shown in FIG. 1.

Referring now more particularly to the drawings, a supersensitive check valve 10 arranged in accordance with my invention is shown in an exemplarily application involving here a hot water heater or tank 12 having an external convectional circulating loop 14. The convection loop has an upper leg 16 coupled to the top of the tank 12 and a lower leg 18 coupled to the bottom thereof, in the usual manner. Conduit 20 is extended through the top of the hot water tank 12 to a point near the bottom thereof and is connected to a source (not shown of cold water to be heated.

When hot water is not being withdrawn from faucet 22 convection currents are established throughout the convection loop 14 in the direction denoted by arrows 24 and 26. Without the installation of a suitable check valve, such as check valve 10, in the return leg 18 of the convection circuit, opening of the faucet 22 withdraws water from both the top and bottom of the tank 12 as denoted by arrows 24 and reverse flow arrows 28 in the return leg 18 of the convection loop 14. As cold water enters the tank 12 from conduit 20, as denoted by arrow 30, the hot water withdrawn through faucet 22 decreases in temperature from admixture of cooler water flowing through the return leg 18 (arrow 28).

The check valve 10 can be installed anywhere in the return leg 18 of the convection circuit 14. I have found, however, that the check valve 10 desirably is installed in that portion of the return leg 18 which is approximately at the level at the top of the hot water heater or tank 12. In this position I have found that the operation of the check valve 10 is even more effective and reliable.

It should be kept in mind that the aforementioned description of an illustrative application is merely by way of example, and is not limitative of the many applications wherein my disclosed check valve exhibits improved results in comparison with conventional check valves. The aforegoing description, therefore, is merely typical of those applications requiring a supersensitive check valve for which no satisfactory substitute exists. The described application likewise illustrates the resistance of my novel check valve to jamming or other malfunction resulting from its use in a corrosive environment containing considerable foreign matter such as boiler scale.

Turning now to the construction of my novel check valve, the valve 10 includes a bipartite housing having an upper section 32 (as viewed in FIG. 1 of the drawings) and a complementary lower section 34. The housing components 32, 34 are secured together by a number of mounting bolts 36 inserted respectively through apertured lugs 38 and 40 secured respectively to the upper and lower housing sections 32, 34. The lugs 38 and 40 desirably are equally spaced about the peripheries of the housing sections 32, 34. When the housing sections 32, 34 are thus joined, the junction therebetween is sealed by means of an O-ring 42 seated upon a recessed shoulder 44 of the lower housing section 34 and engaged by a similar shoulder 46 of the upper housing section.

In this example, each housing section 32 or 34 is provided with an integral mounting sleeve 48 or 50, each having an internal pipe thread 52 or other conventional means for joining the check valve 10 to adjacent piping components of the system in which it is used.

A lightweight checking element 54, as better shown in FIG. 2, is enclosed within the enlarged cavity portion 57 defined by the housing sections 32, 34. The housing cavity 57 communicates with the openings in the mounting sleeves or extensions 48, 50. In this example the checking element is of planar or discoidal configuration and is mounted for movement between open and closed positions denoted in FIG. 1 by its solid outline 54 and its chain outline 56 respectively.

When used in the aforedescribed hot water system (or in other applications where very small differential pressures are available), it is extremely important that the checking element 54 be only slightly heavier than that of the hot water. Thus, the checking element can be opened and closed by the very small forces developed by convection currents in the circulating conduit 14, but will not actually float to interfere with the action of the check valve.

While many materials can be employed in the construction of the checking element 54, I have exemplarily employed a fiberglass reinforced epoxy resin which does not warp when in contact with hot water. This construction yields a desirable specific gravity in the valve disc 54 of about 1.10, although specific gravities in the range of about 1.05 to 1.15 can be employed in this application depending upon the differential pressures available. In this example the checking element is a planar disc and cooperates with a planar valve seat.

Other structural materials can be utilized for the checking elements depending upon the fluid material in which the check valve is employed and upon the sensitivity required.

As better shown in FIGS. 1 and 2 the valve 54 is mounted for sliding movement on a plurality of upstanding posts 58. Each of the posts 58 includes a reduced section 60 and a support or stop section 62. The reduced post sections 60 are loosely inserted through apertures 64 in the valve disc 54, and in addition the ends of the posts are loosely inserted into pockets 66 formed in the adjacent inner surfaces of the upper housing section 32. The enlarged portions 62 of the posts 58 are sized such that they will not pass through the valve disc aperture 64, and hence the post shoulders 63 formed at the junctions between the thickened post sections 62 and the reduced sections 60 serve as stops to limit the opening movements of the valve disc 54, as represented by the solid outline thereof in FIG. 1.

It is contemplated that the recesses 66 can be omitted and the upper ends of the posts 58 terminated closely adjacent the inner surfaces of the upper housing section 38. It is desirable, however, that the recesses 66 be employed with the ends of the posts 58 spacedly inserted therein to eliminate any possibility of the valve disc 56 from hanging up on the ends of the posts 58 in the event that an oversized O-ring 46 be employed or the latter is not fully compressed when the valve 10 is assembled.

As better shown in FIGS. 2—4 the posts 58 and recesses 66, which in this example are three in number, although a different number can be utilized, are spaced equally about the openings extending through the sleeve sections 48, 50 respectively. This arrangement facilitates assembly of the housing sections 32, 34 of the valve 10. For the same purpose the lugs 38, 40 are likewise spaced equidistantly about the housing sections 32, 34 so that a lug 38 of the upper housing section does not have to be assembled with any particular one of the lugs 40 of the lower housing section in order to insert the ends of the posts 58 into the recesses 66 therefor.

It will also be evident, particularly from FIGS. 3 and 4, that the posts 58 and the recesses 66 are sufficiently removed from the edges of the aforementioned sleeve openings so as to afford sealing engagement between the checking element 54 and valve seat 68 defined by the upper inner surface of the upper housing section 32. Although in the arrangement shown the valve seat 68 must be planar to accommodate the planar valve disc 54, it is not important that the valve seat 68 be exactly perpendicular to the posts 58. The reduced post portions 60, which are loosely fitted through the valve disc apertures 64, permit a considerable degree of tilt to the valve disc and concomitant self-aligning of the valve disc 54 with the valve seat 68.

If desired, an annular valve seat 70 (chain-outlined in FIG. 4) can be milled upon the upper housing inner surface 68 to provide an annular line contact with the valve disc 54 at its closed position 56 (FIG. 1). Here again, the alternative valve seat 70 need not be precisely perpendicular to the posts 58, or to the vertical axis of the valve as viewed in FIG. 1, owing to the self-aligning feature of the valve disc 54.

In operation, assuming the valve disc 54 is in its closed or seated position 56 (FIG. 1) the small convection currents in the direction of arrows 26 in leg 18 can readily move the valve disc 54 to its open position denoted by its solid outline in FIG. 1. Owing to the light weight of the valve disc 54 and its mounting and guiding arrangement, the valve disc 54 can be moved easily whether the check valve 10 is mounted in a vertical run of the return leg 18 as shown or in a horizontal run thereof. With the valve disc 54 in its open position and resting upon the stops 63 formed by the thickened sections 62 of the posts 58 recirculating flow or forward flow through the check valve 10 proceeds along the path defined by arrows 72 through the housing sleeves 48, 50 and around the outer periphery of the valve disc 54 as denoted by flow arrows 74. In furtherance of the latter purpose the valve disc 54 is spaced inwardly from the adjacent wall surfaces of the cavity 57. In this example, the housing surfaces 76 and 78 are flared outwardly to provide a maximum flow area and to reduce fluid friction.

Upon opening the faucet 22, the initial tendency of flow in the reverse direction through the return leg 18, as denoted by arrows 80, immediately closes the check valve 10 by moving the valve disc 54 from its solid outline position to its chain outline position 56 against the valve seat 68 (FIG. 1). Owing to the lightweight of the valve disc 54 this closure is immediate. Further, there is no likelihood of the valve disc 54 hanging up either in its opened position or closed position or in some intermediate position owing to its loose engagement with its guiding arrangement including the posts 58. The scraping action of the valve disc 54 upon the posts 58 prevents the accumulation of boiler scale or other debris thereon.

The aforedescribed arrangement of the check valve 10 and particularly the housing sections 32, 34 thereof facilitate assembly and disassembly of the check valve and its installation within a given system. The housing arrangement of my novel check valve mechanism enables the check valve to be employed as a union in a given plumbing arrangement. By this feature of its construction the housing 32, 34 can be readily disassembled to the event that cleaning or maintenance of the check valve ever becomes necessary. The housing 32, 34 can be employed as a union fitting to facilitate disassembly or replacement of other components of the system in which the check valve 10 might be used.

From the foregoing it will be apparent that novel and efficient forms of a supersensitive check valve have been disclosed herein. While I have shown and described certain presently preferred embodiments of the invention and have illustrated presently preferred methods of practicing the same, it is to be distinctly understood that the invention is not limited thereto but may be variously embodied and practiced within the scope of the following claims.

I claim:

1. A check valve comprising a bipartite housing having a pair of dished housing components, means for securing said housing components together in juxtaposition, means for sealing said housing components in peripheral contact, said housing components having inlet and outlet ports respectively, the dished portions of said housing components together defining a flow path between said inlet and outlet ports, a discoidal and planar checking element mounted within said housing for movement between open and closed positions thereof relative to a complementary valve seat formed in one of said housing components at a position surrounding its port, a plurality of elongated guides mounted on the other of said housing components and extending substantially parallel to the path of checking element movement toward said valve seat, the free ends of said guides being substantially equally spaced around the periphery of said valve seat and spaced radially therefrom, said free ends terminating adjacent the dished surface of said one housing component, said checking element slidably engaging said guides throughout its path of movement and extending uninterruptedly across the area defined by said guides on said other housing components for flush engagement with said valve seat and for closure of said one housing component port.

2. The combination according to claim 1 wherein a stop member is formed on each of said guides at a point removed from said valve seat and about midway between said housing components, said stop members together defining the open position of said checking element.

3. The combination according to claim 1 wherein recesses are positioned in said one housing component adjacent said valve seat, said recesses being disposed radially outwardly of said valve seat in a substantially equally spaced array surrounding said valve seat, and the ends of said guides are inserted respectively therein upon assembly of said housing components.

4. The combination according to claim 1 wherein said housing defines a flow path extending radially outwardly of said checking element.

5. The combination according to claim 4 wherein the dished portions of said housing components are spaced radially and peripherally outward of said checking element and said guides to define said flow path which substantially surrounds the peripheral edge of said checking element.

6. The combination according to claim 1 wherein each of said housing components is provided with a recessed shoulder adjacent the junction therebetween and a sealing member is retained between said recessed shoulders.

7. A check valve comprising a housing, a discoidal checking element mounted therein for movement between open and closed positions thereof relative to a complementary valve seat formed in said housing, said housing having an inlet port and an outlet port and defining a flow path therebetween including said valve seat, a plurality of elongated guides mounted in said housing, said guides being disposed parallel to the path of checking element movement, said guides being spaced around the periphery of said valve seat, said checking element slidably engaging said guides throughout its path of movement, a stop member formed on each of said guides at a point removed from said valve seat, said stop members together defining the open position of said checking element, each of said guides being a post having a thickened portion and a reduced portion secured to said thickened portion, said reduced post portions being inserted through apertures therefor in said checking element, and the junctions between said thickened and said reduced post portions forming said stop members.

8. The combination according to claim 7 wherein said checking element apertures are larger than the cross section of said reduced post portions but smaller than said thickened post portions so that boiler scale and the like will not interfere with the sliding engagement between said checking element and said reduced post portions and so that said checking element can tilt relative to said posts for self-alignment with said valve seat.

9. A check valve comprising a housing, a discoidal checking element mounted therein for movement between open and closed positions thereof relative to a complementary valve seat formed in said housing, said housing having an inlet port and an outlet port and defining a flow path therebetween including said valve seat, a plurality of elongated guides mounted in said housing, said guides being disposed parallel to the path of checking element movement, said guides being spaced around the periphery of said valve seat, said checking element slidably engaging said guides throughout its path of movement, said checking element being fabricated from a material having a specific gravity of 1.05 to 1.15 so that said check valve can be employed in a hot water convection system.

10. The combination according to claim 9 wherein said checking element material has a specific gravity of about 1.10.

11. A check valve comprising a bipartite housing having a pair of dished housing components, a discoidal checking element mounted therein for movement between open and closed positions thereof relative to a complementary valve seat formed in said housing, said housing having an inlet port and an outlet port and defining a flow path therebetween including said valve seat, a plurality of elongated guides mounted in said housing, said guides being disposed parallel to the path of checking element movement, said guides being spaced around the periphery of said valve seat, said checking element slidably engaging said guides throughout its path of movement, the dished portions of said housing components are spaced radially and peripherally outward of said checking element and said guides to define said flow path which substantially surrounds the peripheral edge of said checking element.